United States Patent [19]
Schmidt et al.

[11] Patent Number: 5,301,189
[45] Date of Patent: Apr. 5, 1994

[54] TELECOMMUNICATION NETWORK HAVING ATM SWITCHING CENTERS AND STM SWITCHING CENTERS

[75] Inventors: Lothar Schmidt, Fuerstenfeldbruk; Alfred Jugel, Geretsried, both of Fed. Rep. of Germany; Andy Mallinson, Poole, Great Britain; Peter Rau, Munich, Fed. Rep. of Germany

[73] Assignees: Siemens Aktiengesellschaft, Munich, Fed. Rep. of Germany; GPT Limited Coventry, Great Britain

[21] Appl. No.: 932,395

[22] Filed: Aug. 19, 1992

[30] Foreign Application Priority Data

Aug. 19, 1991 [EP] European Pat. Off. ........ 91307635.2

[51] Int. Cl.⁵ .............................................. H04L 12/56
[52] U.S. Cl. ................................. 370/60.1; 370/94.1; 370/105.4
[58] Field of Search ............ 370/60, 60.1, 94.1, 370/94.2, 94.3, 105.4

[56] References Cited
U.S. PATENT DOCUMENTS

| | | | |
|---|---|---|---|
| 4,782,478 | 11/1988 | Day, Jr. et al. | 370/60 |
| 4,862,451 | 8/1989 | Closs et al. | 370/60 |
| 4,999,835 | 3/1991 | Lagoutte | 370/94.1 |
| 5,144,619 | 9/1992 | Munter | 370/94.2 |
| 5,204,857 | 4/1993 | Obara | |

FOREIGN PATENT DOCUMENTS 0354120 2/1990 European Pat. Off.
0365693 5/1990 European Pat. Off.

OTHER PUBLICATIONS

"Synchronous & Asynchronous Transfer Modes in the Future Broadband ISDN", by B. Schaffer, IEEE International Conference on Communications, Jun. 3, 1988, pp. 1552-1558.
"Switching Network Architecture for ATM Based Broadband Communications", by M. S. Henrion et al., May 1990, pp. 1-8.

Primary Examiner—Douglas W. Olms
Assistant Examiner—Hassan Kizou
Attorney, Agent, or Firm—Hill, Steadman & Simpson

[57] ABSTRACT

The telecommunication network is composed to a greater degree of ATM exchanges (ATM) and to a lesser degree of STM exchanges (STM). Information coming from an STM exchange (for example, STM1) ad to be switched to a further STM exchange (for example, STMy) via an ATM exchange (for example, ATM1) are packeted in short cells for through-connection through the ATM exchange (ATM1) in order to reduce the packeting time. These short cells have a shorter length when compared to the standardized message cells used for information transmission between ATM exchanges.

12 Claims, 3 Drawing Sheets

TELECOMMUNICATION NETWORK HAVING ATM SWITCHING CENTERS AND STM SWITCHING CENTERS

BACKGROUND OF THE INVENTION

The present invention is directed to a telecommunication network having switching centers that to a greater degree operate on the basis of asynchronous through-connection of message packets in message cells of a fixed length via virtual connections (ATM exchanges) and to a lesser degree operate on the basis of synchronous circuit-switched through-connection (STM exchanges), comprising interfaces allocated to the ATM exchanges that serve the purpose of connecting transmission lines that are connected to STM exchanges and carrying circuit-switched messages.

Such a telecommunication network is to be understood as a transitional stage to future telecommunication networks wherein the asynchronous transfer mode (ATM) is employed throughout. By contrast to currently installed telecommunication networks, which operate in the synchronous transfer mode (STM), telecommunication networks operating in the ATM mode have a significant advantage. The available transmission capacity of a transmission channel can be flexibly utilized for a multitude of services such as voice, data, image transmission and can thereby be allocated to a single service or to a plurality of services dependent on time and need.

The introduction of a universal telecommunication network on an ATM basis can only be successful when the possibility of cooperation is economically possible of previously existing telecommunication networks operating on an STM basis and executing 64 Kb/s voice services with new switching centers operating on an ATM basis.

A hybrid solution for a telecommunication network has been proposed in this context which provides three functionally separate system components at the exchanges. First is what is referred to as a cross connector for the connection of transmission lines via which information is transmitted at higher bit rates, for example 2 Mb/s, in STM mode, this essentially assuming the function of an electronic main distributor. Second is a narrowband exchange that corresponds in practice to current narrowband exchanges for the connection of central office lines and transmission lines for information transmitted on an STM basis with a bit rate of 64 Kb/s. Finally, third is a broadband exchange that operates on an ATM basis, i.e. as a packet exchange having message cells of fixed length and for setting virtual connections. Each of the three system components of the exchanges of such a hybrid network have separate line units and a separate switching network. Of course, such a solution is extremely cost and maintenance intensive.

By contrast, in the initially described telecommunication network, universal network nodes operating on an ATM basis are provided. With on-going network expansion, the number of these should dominate more and more over network nodes operating on an STM basis and should ultimately be present as the only type of network node. These universal network nodes have only a single ATM switching network for all three types of connection or, respectively, employment of the hybrid telecommunication system.

In order to be able to process information that is incoming on an STM basis, these must be packeted in ATM message cells in interface units and must be in turn depacketed after passing through the switching network and be superimposed into addressed time slots, to which end the appertaining interfaces have packeting/depacketing means.

Since such a universal network node is provided with a uniform switching network, uniform interfaces and a central controller and also operates with uniform pathfinding and uniform maintenance functions, lower capital costs and lower outlay for maintenance result as compared to the aforementioned hybrid solution. Moreover, expandability is established without particular outlay in the basic equipment.

As presented, the STM messages must be packeted in ATM message cells in order to also be able to process STM messages in such a universal ATM network node.

The format of such ATM message cells is already largely defined, whereby a useful information field that covers 48 time slices covering 8 bits each, what are referred to as octets, is provided per message cell in addition to a message header. At least one of these can be utilized for further particulars about, for example, the nature of the message cell.

For packeting the samples of a time channel respectively coded with 8 bits for transmission of 64 Kb/s voice information, the chronological duration of 47 sampling pulse frames is required in this case, so that a packeting time of $48 \times 125 \mu s = 6$ ms is required together with the one octet. With jitter compensation, the depacketing requires approximately 0.25 ms, so that a time delay of 6.25 ms arises overall in the transmission in one direction.

In current digital telephone networks, approximately 1.5 ms are allowed for local exchanges as transit times within the exchanges that mainly arise due to the analog-to-digital conversion or digital-to-analog conversion. Approximately 1.0 ms per transmission direction are allowed for tandem switching centers, so that an allowable overall transit time of at most 15 ms per transmission direction results for a network in which a connection runs by a maximum of 3 local exchanges and a maximum of 6 tandem switching centers given a maximum distance of approximately 1000 km.

The maximum delay time allowed in Great Britain is only 12.5 ms, whereas in the U.S., it is 17.5 ms per transmission direction. The demands made with respect to adhering to transit time limits serves the purpose of assuring the voice quality, since longer transit times lead to noticeable echo effects because of the reflections of the voice signals at the hybrid circuits in the subscriber terminal equipment of the listening subscriber.

The aforementioned delays of 6.25 ms arising in conjunction with the packeting/depacketing procedure are thus approximately 5 ms greater than the required transit time limit for exchanges.

In order to assure the required voice quality under these conditions, separate echo compensators must be utilized per transmission direction. However, over and above this, care would also have to be exercised to ensure that a plurality of network transitions whereat the aforementioned delay due to packeting/depacketing procedures respectively arises, are avoided in voice connections since a compensation of transit time on the order of the required magnitude for a plurality of network transitions can no longer be governed with echo compensators. This, however, would require an involved intermeshing between the STM exchanges of the STM network that still exists and the ATM exchanges that are intended to be the basis for the future universal network.

For the purpose of reducing the delay times in the packeting of STM voice information that is transmitted with a transmission rate of 64 Kb/s, it has therefore been proposed in conjunction with a telecommunication network of the type initially described to only partially occupy the message cells of fixed length in the ATM system with STM messages (European Patent Application 88 11 57 25.9). Such a procedure, of course, means a poor exploitation of the transmission capacity. In order to provide a certain amount of compensation, it has also been proposed in the patent application to respectively define the degree of occupation of the message cells during call set up in call-associated fashion in accord with the call set up information co-transmitted during the call set up and to keep this low for long-distance connections that proceed via a plurality of exchanges but to allow a higher degree of filling for connections in the local area.

It is precisely in long-distance connections, however, that a high bit rate is particularly desirable for economical reasons, since the proportion of the costs for the transmission technology outweighs those for the exchanges. Apart therefrom, of course, the measures for improving the exploitation of the transmission capacity also require a considerable outlay in terms of control.

SUMMARY OF THE INVENTION

It is an object of the present invention to provide a telecommunication network of the type initially described such that echo compensators and involved intermeshing structures required in the prior art for voice quality are largely avoided and a significant reduction in the degree of utilization of the existing transmission capacity is nonetheless acceptable for useful information, i.e. voice information in this case.

This object is inventively achieved in that the packeting/depacketing means, contained in the interfaces of the ATM exchanges for connections to be set up between an STM exchange via an ATM exchange and a further ATM exchange or terminal equipment (ATM terminal equipment) equipped for the reception of asynchronously through-connected message packets, packet the incoming circuit-switched messages into message cells having a first, fixed length like those that are also formed for connections between ATM exchanges or ATM terminal equipment. However, the circuit-switched messages for through-connection via the ATM exchange are packeted in message cells having a shorter, fixed length in comparison thereto for connections between STM exchanges to be produced via an ATM exchange.

In the solution of the present invention no parts of the message cells remain unused, so that a better exploitation of the transmission capacity for useful information results even taking into consideration what is a somewhat less beneficial relationship between the header part and the information part of the message cells.

Further developments of the present invention are directed to alternatives that can be realized in a cost-beneficial way in the synchronization to the cell beginning also required for such short cells.

Together with a synchronizing word, information about the length category of either the neighboring, following message cell or about the length category of the appertaining cell is mixed into the message cell header of the short cells. In an alternative thereto, synchronizing words without such a length description are inserted into a sequence of message cells at the spacing of the length of a short cell, whereby it is assumed that the length of the short cells is a whole-numbered fraction of the length of the message cells having a full length.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
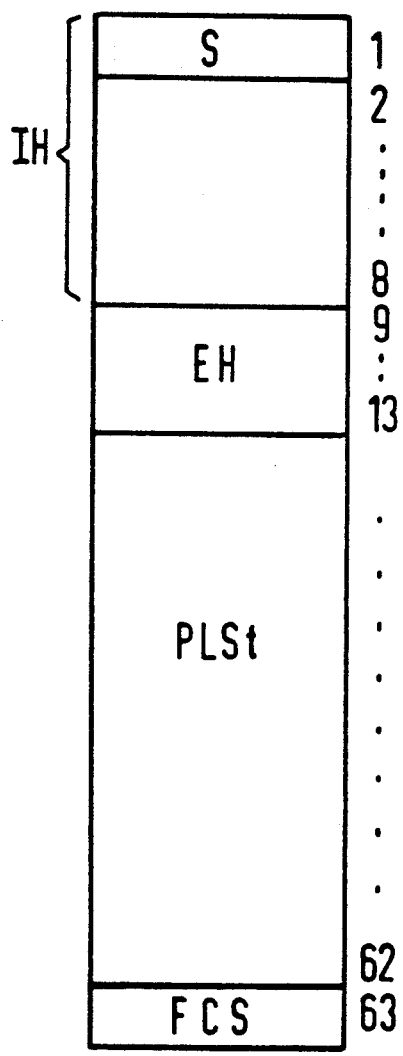
FIG. 1 depicts the format of an internal standard message cell for through-connection by exchanges in ATM telecommunication networks.

The standard message cell according to FIG. 1 has a total of 63 octets, i.e. time slices for respectively 8 bits each. Eight such octets are occupied by an internal cell header IH (internal header) that essentially contains a synchronization octet S, octets containing routing information for the path through the switching network, as well as one octet for a cell number for identifying the cell sequence. A further cell header, the external cell header EH (external header) covers 5 octets and contains particulars about a virtual channel and a virtual connecting path to which the appertaining message cell is allocated.

This is followed by an information part PLSt covering 48 octets wherein the actual telecommunication information is transmitted. Last is another octet FCS that indicates the cell end.

The aforementioned internal header IH is removed after traversing an exchange before continued transmission of the message cell, so that externally appearing cells are composed only of the external header EH and of the information part PLSt.

Figure 2:
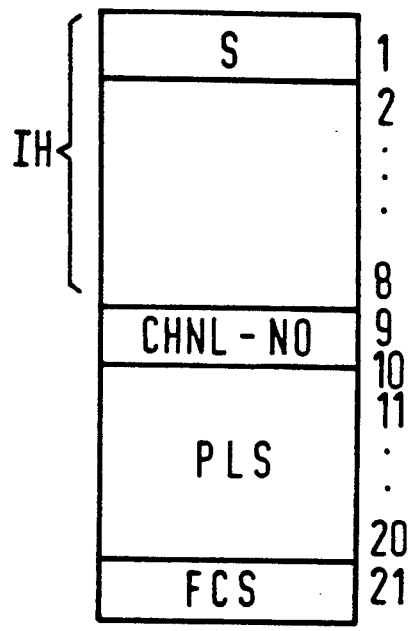
FIG. 2 depicts the format of a short cell inventively used within an ATM exchange for the through-connection of STM messages to STM exchanges.

The number of octets of the short cell shown in FIG. 2 and inventively employed for the through connection of STM information via ATM exchanges is a sub-set of the octet of the standard cell. As an example, there are 21 octets in this case, one-third of the number of octets of a standard cell according to FIG. 1.

The internal header IH of this short cell is of the same length and is occupied in the same way as that of the standard cell.

Since the short cell in this form is used only within an ATM exchange, an external header EH like that in the standard cell is not required.

Instead, a tenth octets contains a designation to the effect that the appertaining message cell is a short cell and two further octets serve the purpose of indicating the number of the time channel of the STM information and an indication of the destination interface via which the STM messages are to be forwarded to an STM exchange from the ATM exchange. Eight octets 13 through 20 form the information part PLS of this message cell, whose length is one-sixth of the length of the information part of a standard cell, as a result whereof the packeting time is reduced from 6 ms to 1 ms. Finally, an indicator FCS in octet 21 indicates the end of the cell.

Figure 3:
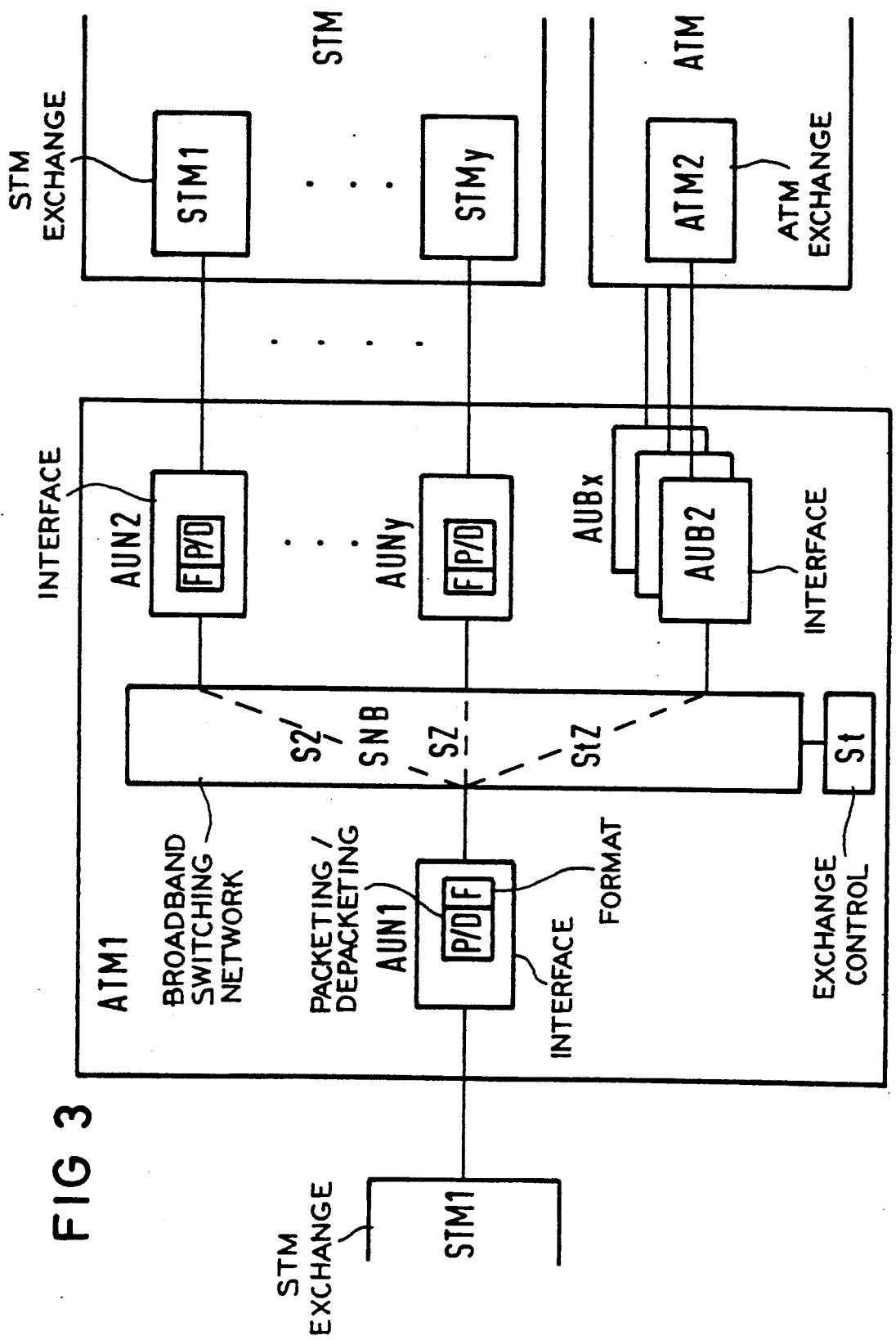
FIG. 3 is a block diagram of a part of a telecommunication network having STM exchanges and ATM exchanges.

FIG. 3 shows the portion of a telecommunication switching network that covers exchanges operating both on an ATM basis as well as on an STM basis.

STM exchanges STM1 through STMYy are in communication via interfaces AUN1 through AUNy with an ATM exchange ATM1 that is shown in somewhat greater detail.

There is also a connection of the ATM exchange ATM1 to further ATM exchanges, for example ATM2, via interfaces AUB2 through AUBx.

A broadband switching network SNB and an exchange controller ST are shown as critical components of the ATM exchange ATM1.

Packeting/depacketing units P/D are situated in the interface units AUN1 through AUNy. Decoded time slot contents of the channel information coming from an STM exchange are ordered into an ATM message cell by means of these packeting/depacketing units P/D or are in turn depacketing at the output side and are ordered in time slots for continued transmission to an STM exchange. Formatting units F of these interface units handle a formatting of message cells as standard cells or as short cell.

Insofar as connections are involved that lead from an STM exchange, i.e., for example, from the STM exchange STM1, via the ATM exchange ATM1 to another ATM exchange, for example ATM2, cells having the standard format are formed in the interface AUN1, as shown in FIG. 1. This thereby takes the situation into consideration that the standardized ATM transmission protocol must be observed between ATM exchanges, i.e. between the interface AUB1 and the ATM exchange ATM2 in this case.

Insofar as connections between two STM exchanges, are involved, i.e., for example, connections between the exchange STM1 and the exchange STM2, that are to be conducted via the ATM exchange ATM1, short cells of the aforementioned type are inventively formed in the interface AUN1, are switched as such short cells via the switching network SNB and are in turn depacketed in the interface AUN2, whereby their content is again ordered in time slots of the appertaining time channel recited in the useful part of the cell. The short cell is thus used only within the ATM exchange ATM1 and no infractions of prescribed protocols result. What is avoided on the other hand, as desired, is having inadmissibly high delay times arise during packeting, these potentially leading to the aforementioned, inadmissible echo affects in the transmission of voice signals.

The synchronizing words of the message cells formed in the interfaces AUN (whether they are cells in standard format according to FIG. 1 or short cells according to FIG. 2) are provided with a bit that contains a cell length indicator.

Figure 4:
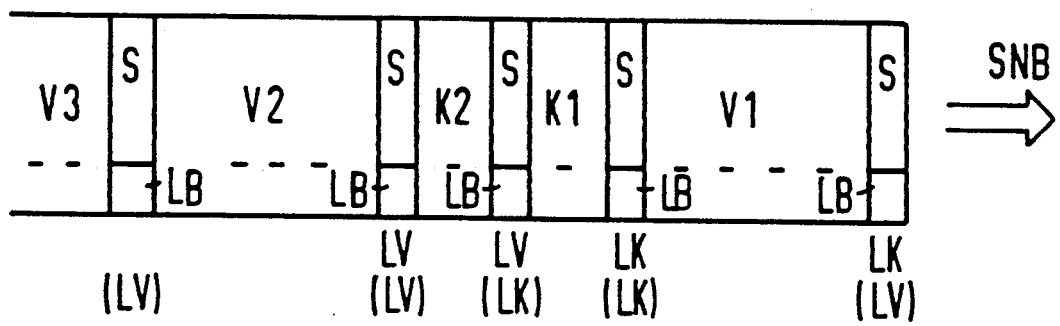
FIGS. 4 and 5 depict sequences of short and standard cells together with synchronizing words for illustrating different synchronization versions.

FIG. 4 shows a sequence of standard cells having a full length V and short cells K formed in such an interface that are forwarded to the broadband switching network SNB of an ATM exchange. According to a first, further development of the present invention an indicator LV or LK regarding the length of the chronologically adjacent, following message cell is contained in one bit LB of the synchronizing words S of these message cells. The appertaining bit of the synchronizing word of the standard message cell of full length V1 that is first in the chronological sequence thus indicates that the following message cell, i.e. K1, is a short cell (LK). The appertaining bit of the synchronizing word of this message cell likewise indicates that a short cell follows, namely the short cell K2, etc., etc.

According to another version of this embodiment that is illustrated with bracketed expressions in FIG. 4, respectively one bit LB in the synchronizing words of the message cell indicates the length of the appertaining, following message cell, i.e. (LK) or, respectively, (LV).

Figure 5:
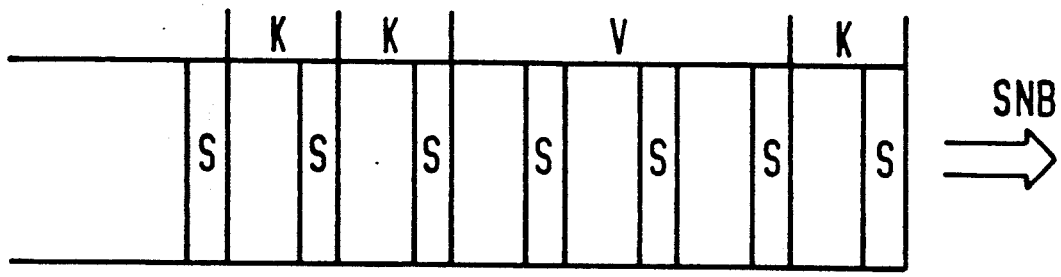

According to another version for resolving the problem of synchronization in the succession of short cells and standard cells, a synchronizing word without further features is mixed in the bit stream supplied to the broadband switching network SNB at the spacing of the length of a short cell, as illustrated in FIG. 5.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A telecommunication network having a plurality of switching centers composed of ATM exchanges and STM exchanges, the ATM exchanges of the plurality of switching centers operating on the basis of asynchronous through-connection of messages in message cells of a fixed length via virtual connections and the STM exchanges of the plurality of switching centers operating on the basis of synchronous, circuit-switched through-connection, the ATM exchanges having interfaces for connecting transmission lines that are connected to STM exchanges and that carry circuit-switched messages, comprising: in the interfaces of the ATM exchanges, packeting/depacketing means for packeting received circuit-switched messages into first message cells of a first fixed length, for connections to be set up between an STM exchange via an ATM exchange and a further ATM exchange or ATM terminal equipment equipped for the reception of asynchronously switched messages, said first message cells of said first fixed length being also employable for connections between ATM exchanges or ATM terminal equipment, and means for packeting received circuit-switched messages into second message cells having a second fixed length for connections between STM exchanges set up via an ATM exchange, said second fixed length being less than said first fixed length.

2. The telecommunication network according to claim 1, wherein a first message cell has an internal header and an external header, in combination with an information part, and an end of cell indicator, and wherein a second message cell has only an internal header in combination with at least an information part and an end of cell indicator.

3. The telecommunication network according to claim 1, wherein the interfaces have means for forming a sequence of first message cells and second message cells, each cell preceded by a synchronizing word for identifying a cell beginning, the synchronizing word also containing an indicator regarding a length category of an associated message cell.

4. The telecommunication network according to claim 1, wherein each of the interfaces have means for placing synchronizing words for identifying a cell beginning in front of message cells, said synchronizing words also containing an indicator regarding a length category of a chronologically adjacent, following message cell.

5. The telecommunication network according to claim 1, wherein given second message cells having a second fixed length that is equal to 1/N of said first fixed length where N is a whole number, the interfaces have means for mixing synchronizing words into a sequence of generated message cells at a spacing of a length that is equal to the second fixed length of the second message cells, being mixed thereinto at a respective beginning of the message cells or within the message cells given message cells of said first fixed length.

6. The telecommunication network having a plurality of switching centers composed of ATM exchanges and STM exchanges, the ATM exchanges of the plurality of switching centers operating on the basis of asynchronous through-connection of messages in message cells of a fixed length via virtual connections and the STM exchanges of the plurality of switching centers operating on the basis of synchronous, circuit-snitched through-connection, the ATM exchanges having interfaces for connecting transmission lines that are connected to STM exchanges and that carry circuit-switched message, comprising: in the interfaces of the ATM exchanges, packeting/depacketing means for packeting received circuit-switched messages into first message cells of a first fixed length, for connections to be set up between an STM exchange via an ATM exchange and a further ATM exchange or ATM terminal equipment equipped for the reception of asynchronously switched messages, said first message cells of said first fixed length being also employable for connections between ATM exchanges or ATM terminal equipment, and means for packeting received circuit-switched messages into second message cells having a second fixed length for connections between STM exchanges set up via an ATM exchange, said second fixed length being less than said first fixed length, a first message cell has an internal header and an external header, in combination with an information part, and an end of cell indicator and wherein a second message cell has only an internal header in combination with at least an information part and an end of cell indicator.

7. The telecommunication network according to claim 6, wherein the interfaces have means for forming a sequence of first message cells and second message cells, each cell preceded by a synchronizing word for identifying a cell beginning, the synchronizing word also containing an indicator regarding a length category of an associated message cell.

8. The telecommunication network according to claim 6, wherein each of the interface have means for placing synchronizing words for identifying a cell beginning in front of message cells, said synchronizing words also containing an indicator regarding a length category of a chronologically adjacent, following message cell.

9. The telecommunication system according to claim 6, wherein given second message cells having a second fixed length that is equal to 1/N of said first fixed length where N is a whole number, the interfaces have means for mixing synchronizing words into a sequence of generated message cells at a spacing of a length that is equal to the second fixed length of the second message cells, being mixed thereinto at a respective beginning of the message cells or within the message cells given message cells of said first fixed length.

10. The telecommunication network having a plurality of switching centers composed of ATM exchanges and STM exchanges, the ATM exchanges of the plurality of switching centers operating on the basis of asynchronous through-connection of messages in message cells of a fixed length via virtual connections and the STM exchanges of the plurality of switching centers operating on the basis of synchronous, circuit-switched through-connection, the ATM exchanges having interfaces for connecting transmission lines that are connected to STM exchanges and that carry circuit-switched messages, comprising: in the interfaces of the ATM exchanges, packeting/depacketing means for packeting received circuit-switched messages into first message cells of a first fixed length, for connections to be set up between an STM exchange via an ATM exchange and a further ATM exchange or ATM terminal equipment equipped for the reception of asynchronously switched messages, said first message cells of said first fixed length being also employable for connections between ATM exchanges or ATM terminal equipment, and means for packeting received circuit-switched messages into second message cells having a second fixed length for connections between STM exchanges set up via an ATM exchange, said second fixed length being less than said first fixed length, the second message cells having an internal header as a cell header, an information part and an end of cell indicator; and means for placing synchronizing words for identifying a cell beginning in front of message ells, said synchronizing words also containing an indicator regarding a length category of a chronologically adjacent, following message cell.

11. The telecommunication network according to claim 10, wherein each of the interfaces have means for forming a sequence of first message cells and second message cells, each cell preceded by a synchronizing word for identifying a cell beginning, the synchronizing word also containing an indicator regarding a length category of an associated message cell.

12. The telecommunication system according to claim 10, wherein given second message cells having a second fixed length that is equal to 1/N of said first fixed length where N is a whole number, the interfaces have means for mixing synchronizing words into a sequence of generated message cells at a spacing of a length that is equal to the second fixed length of the second message cells, being mixed thereinto at a respective beginning of the message cells or within the message cells given message cells of said first fixed length.

* * * * *